(12) United States Patent
Wang et al.

(10) Patent No.: US 7,016,418 B2
(45) Date of Patent: Mar. 21, 2006

(54) TILED MEMORY CONFIGURATION FOR MAPPING VIDEO DATA AND METHOD THEREOF

(75) Inventors: Chun Wang, Toronto (CA); Paul Chow, Richmond Hill (CA); Richard K. Sita, Audubon, NJ (US); Philip L. Swan, Richmond Hill (CA)

(73) Assignee: ATI Technologies, Inc., Thornhill (CA)

( * ) Notice: Subject to any disclaimer, the term of this patent is extended or adjusted under 35 U.S.C. 154(b) by 739 days.

(21) Appl. No.: 09/923,520

(22) Filed: Aug. 7, 2001

(65) Prior Publication Data

US 2003/0031258 A1    Feb. 13, 2003

(51) Int. Cl.
*H04N 7/12* (2006.01)
*H04N 9/64* (2006.01)

(52) U.S. Cl. .................................. 375/240.24
(58) Field of Classification Search ........... 375/240.24, 375/240; 348/712, 713, 714, 715, 716, 717, 348/718, 719, 231.1, 232.2, 234; H04N 7/12, H04N 9/64
See application file for complete search history.

(56) References Cited

U.S. PATENT DOCUMENTS

| | | | |
|---|---|---|---|
| 5,664,162 A | 9/1997 | Dye | |
| 5,793,693 A | 8/1998 | Collins et al. | |
| 5,844,541 A | 12/1998 | Cahill, III | |
| 5,854,620 A | 12/1998 | Mills et al. | |
| 5,878,240 A | 3/1999 | Tomko | |
| 5,912,676 A | 6/1999 | Malladi et al. | |
| 5,924,111 A * | 7/1999 | Huang et al. ................... 711/5 |
| 5,937,204 A | 8/1999 | Schinnerer | |
| 5,938,756 A | 8/1999 | Van Hook et al. | |
| 5,949,428 A | 9/1999 | Toelle et al. | |
| 5,973,696 A | 10/1999 | Agranat et al. | |
| 6,064,407 A | 5/2000 | Rogers | |
| 6,088,355 A | 7/2000 | Mills et al. | |
| 6,104,416 A * | 8/2000 | McGuinness ................ 345/544 |
| 6,189,064 B1 | 2/2001 | MacInnis et al. | |
| 6,204,863 B1 | 3/2001 | Wilde | |
| 6,215,822 B1 * | 4/2001 | Bose et al. ............ 375/240.16 |
| 6,252,612 B1 | 6/2001 | Jeddeloh | |
| 6,297,832 B1 | 10/2001 | Mizuyabu et al. | |
| 6,301,299 B1 * | 10/2001 | Sita et al. ............. 375/240.01 |
| 6,326,984 B1 | 12/2001 | Chow et al. | |
| 6,330,036 B1 | 12/2001 | Murakami et al. | |
| 6,493,036 B1 | 12/2002 | Fernandez | |
| 6,496,192 B1 * | 12/2002 | Shreesha et al. ............ 345/540 |
| 6,538,656 B1 | 3/2003 | Cheung et al. | |

* cited by examiner

*Primary Examiner*—Nhon Diep
(74) *Attorney, Agent, or Firm*—Toler, Larson & Abel, LLP (57) ABSTRACT

A method of mapping motion pictures experts group (MPEG) video information for improved efficiency is presented, wherein image information is stored in blocks of memory referred to as tiles. Tiles are mapped in memory so that adjacent tiles only correspond to different banks of memory. A method and system is provided for organizing and routing multiple memory requests from a plurality of clients to multiple memories. Requests from a plurality of clients, including a plurality of clients of the same type, such as multiple MPEG decoders, are directed to different memory controllers by a router. The memory controllers order the client requests by requests among similar client types. The memory controllers also order the client requests by different client types. The ordered requests are then delivered to memory. Returned data is sent back to the clients.

18 Claims, 6 Drawing Sheets

TILED MEMORY CONFIGURATION FOR MAPPING VIDEO DATA AND METHOD THEREOF

CO-PENDING APPLICATIONS

This invention is related to co-pending patent applications entitled "METHOD AND APPARATUS FOR STORING AND DISPLAYING VIDEO IMAGE DATA IN A VIDEO GRAPHICS SYSTEM", which has an application Ser. No. 09/186,034 and the filing date of Nov. 3, 1998 (now U.S. Pat. No. 6,326,984, issued on Dec. 4, 2001); "METHOD AND APPARATUS FOR MEMORY ACCESS SCHEDULING IN A VIDEO GRAPHICS SYSTEM", application Ser. No. 09/224,692 and the filing date of Jan. 4, 1999 (now U.S. Pat. No. 6,297,832, issued on Oct. 2, 2001); and U.S. patent application Ser. No. 09/923,524 entitled "SYSTEM FOR TESTING MULTIPLE DEVICES ON A SINGLE SYSTEM AND METHOD THEREOF" having and filed on even date herewith.

FIELD OF THE INVENTION

The present invention relates generally to memory and more particularly to mapping data in memory.

BACKGROUND OF THE INVENTION

As modern society progresses into the digital revolution, multimedia has become more prevalent. Music is digitally encoded into compact discs (CDs) as well as digital files, such as with Motion Pictures Experts Group Layer 3 (MP3) format. Movie audio and video is encoded into digital video disks (DVDs). Television video and audio is now being recorded digitally in select areas. Analog television is being replaced by digitally encoded television, such as standard definition television (SDTV) and high definition television (HDTV).

Individual digital media types must be decoded electronically. Each digital media type has its own decoding scheme. To access available media, individual decoders are used. To allow a single system to offer access to many of the digital media available, the individual media decoders are integrated into the system. Many of the media types require intensive processing and high bandwidth, such as with Motion Pictures Experts Group (MPEG) video decoding. A system is heavily burdened when processing requests from multiple media decoders. The time for a system to process a single request for a single media decoder can substantially increase when multiple decoders are being used. The delay to process a request can exceed the media decoder's limits. When a system does not adequately handle a request in the time allotted from a media decoder, the media is not properly decoded and the system has failed in providing service for that media.

Therefore, a system that overcomes these problems would be useful.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE FIGURES

At least one embodiment of the present invention provides for a method of mapping data, related to a media-decoding client, in memory. The method comprises storing data in a tiled-surface format. The tiled-surface format is a logical arrangement of tiles representing a plurality of pages within memory banks. The tiles are arranged such that pages of data for sequential retrieval are implemented in different memory banks. The method further comprises retrieving the data from memory. An advantage of at least one embodiment of the present invention is that requests from multiple MPEG decoders can be handled by a single device. Another advantage of at least one embodiment of the present invention is that multiple memories can be used to efficiently handle requests from a plurality of clients.

Figure 1:
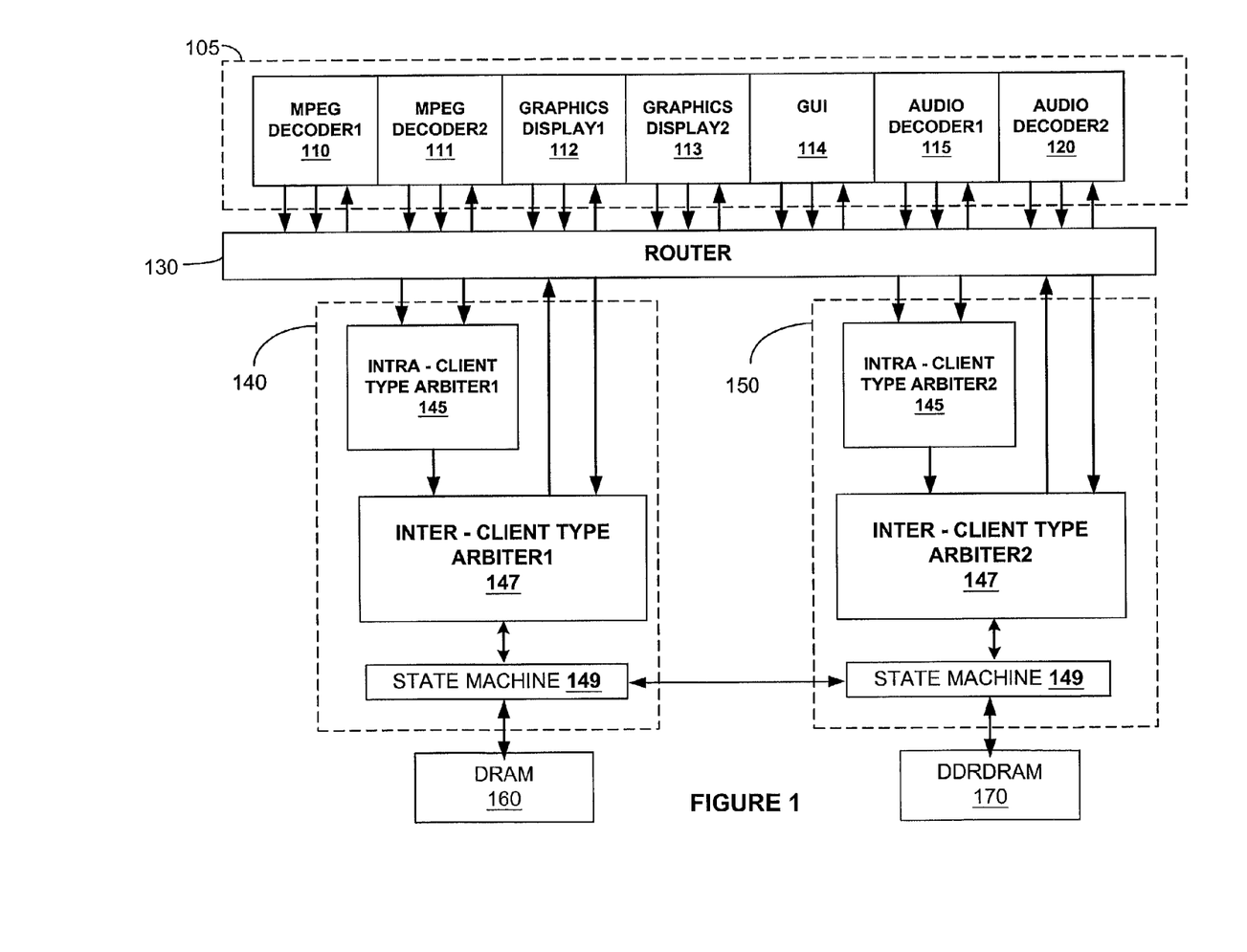
FIG. 1 is a block diagram of a system for handling memory requests from a plurality of clients and routing them to multiple memory devices, according to an embodiment of the present invention.

Referring to FIG. 1, a system for routing requests from multiple clients to independent memory devices is shown, according to one embodiment of the present invention. Memory requests made by clients 105 are routed to one of two memory controllers, memory controller 140 or memory controller 150. The memory controllers route the individual requests to their respective memory devices, dynamic random access memory (DRAM) 160 for memory controller 140 and double data rate dynamic random access memory (DDRDRAM) 170 for memory controller 150. In a specific embodiment of the present invention, memory blocks 160 and 170 include the same memory types.

Clients 105 represent multimedia components that require access to memory to run their processes. Clients 105 can include multiple clients of different types, such as first graphics display 112 and first audio decoder 115, as well as multiple clients of the same type, such as first Motion Pictures Experts Group (MPEG) decoder 110 and second MPEG decoder 111. In one embodiment, clients 105 include multiple decoders to handle video and audio, as part of an information handling system. First MPEG decoder 110 and second MPEG decoder 111 handle video decoding, such as for digital video disk (DVD) video data and digital television (DTV) data. In one embodiment, first MPEG decoder 110 decodes standard definition television (SDTV) video data and second MPEG decoder 111 decodes high definition television (HDTV) video data. First graphics display 112 and second graphics display 113 decode graphics, such as text and general information handling system graphics. Graphical user interface (GUI) 114 decodes information for display on a monitor. First audio decoder 115 and second audio decoder 120 decode audio data from digital formats, such as MPEG layer-3 (MP3) audio or compact disc (CD) audio. In operation, each of clients 105 makes calls, or requests, to write information to or read information from particular memory addresses. It should be appreciated that other clients may also be included under clients 105, such as streaming video and audio decoders, without departing from the present scope of the invention.

A router 130 receives requests for memory access generated by clients 105. Router 130 controls which memory controller the request should be sent to, and can route the requests based on the memory address a client 105 is attempting to access. In one embodiment, each of the client requests is given a "tag". A tag is a client-specific identifier attached to each client request. The tag can provide information about the client that initiated the request as well as the purpose of the request. The client tag information can be used to differentiate among the client requests and determine to which memory controller the router 130 should route the request. Client tags can be used to ensure that the bandwidth needs of the client request are properly met by memory controllers 140 and 150.

Different memory blocks can be used to access memory with higher bandwidth or a faster data rate. For example, in one embodiment, second MPEG decoder 111 is used for decoding high bandwidth HDTV video data. To meet these needs efficiently, DDRDRAM 170 can be used with a larger bus width than the bus width used by DRAM 160. Any clients 105 which need more bandwidth to run smoothly, such as second MPEG decoder 111, can have their requests directed to DDRDRAM 170, which operates at a higher data rate, through memory controller 150. As previously discussed, in a specific embodiment, memory devices 160 and 170 represent the same type of memory, such as DRAM, or different types of memory as needed for specific system level implementations.

The amount of memory available on DRAM 160 and DDRDRAM 170 may also be different. Router 130 can route client requests to the respective memory controllers, memory controller 140 and memory controller 150, to allow the requests to be received where space is most readily available. Router 130 can also route requests from similar high bandwidth clients to different memory controllers to ensure that a single memory device is not overburdened with all the high bandwidth requests. For example, in one embodiment, first MPEG decoder 110 and second MPEG decoder 111 both decode HDTV data. To ensure that requests from both first MPEG decoder 110 and second MPEG decoder 111 are handled efficiently, requests from first MPEG decoder 110 are delivered to memory controller 140 while requests from second MPEG decoder 111 are delivered to memory controller 150, allowing the heavy processing workload to be divided among the available memory devices, DRAM 160 and DDRDRAM 170. Router 130 is used to route the requests from different clients of clients 150, allowing the memory resources, DRAM 160 and DDRDRAM 170, to be used efficiently. In a specific implementation, the router 130 receives and/or accesses one or more storage devices, such as a register (not shown), to determine the routing for a specific client. In this implementation, a routing scheme can be programmed for a specific system requirement, and may even be controlled dynamically.

The routed requests are sent to one of at least two memory controllers, memory controller 140 or memory controller 150. Each memory controller can be used to handle requests requiring varying bandwidth. In one embodiment, first MPEG decoder 110 decodes SDTV video data and second MPEG decoder 111 decodes HDTV video data. Memory controller 150 can be used, along with a high-bandwidth memory device, such as DDRDRAM 170, to handle the higher bandwidth requirement of the HDTV data from second MPEG decoder 111. Bus lines used with DDRDRAM 170 can be wider to accommodate a higher bandwidth. Memory controller 140 can be used to handle requests that are less intensive than those routed to memory controller 150. Memory controller 140 can be implemented to support general memory requests such as from GUI 114, first audio decoder 115 or second audio decoder 120. Requests with SDTV data, such as from first MPEG decoder 110, requiring less bandwidth than second MPEG decoder 111, can be sent to memory decoder 140. In another embodiment, one memory controller may be dedicated to video and audio decoding while the other memory controller is dedicated to a central processing unit (CPU) which may be a system control processor running an operating system.

Memory controllers 140 and 150 are preferably "transparent" to clients 105. Clients 105 do not need to alter their data request to accommodate memory controllers 140 and 150. If the data requests sent by clients 105 are of a different format than what memory controllers 140 and 150 use, memory controllers 140 and 150 can alter the request format themselves, and convert any responses so they will be understood by clients 105. Requests to/from clients 105 are preferably formatted as if clients 105 were communicating directly with memory.

Within memory controllers 140 and 150, the client requests are sent through an intra-client arbiter 145. Intra-client arbiter 145 determines which of the clients, among similar type clients, such as first MPEG decoder 110 and second MPEG decoder 111, should be directed to the memory device under the control of its memory controller, such as DRAM 160 under the control of memory controller 140 and DDRDRAM 170 under the control of memory controller 150. Intra-client arbiter 145 can choose among clients of a similar type based on a priority. Using client tags, some client requests may be given priority over another. For example, first audio decoder 115 may be decoding MP3 audio data and may be considered a higher priority client than second audio decoder 120 which may be decoding CD audio data. The memory request from first audio decoder 115 would be processed before the request from second audio decoder 120.

The choice of priority may be made due to the amount of data required or the time it would take to process the request. Priority can be issued to ensure that the request is processed within a certain amount of time required by the client, allowing the processing performed by clients 150 to be uninterrupted by the delay in processing a particular request. As different clients of a specific client type may have different latency requirements, different priorities can be assigned to the clients. Latency is the amount of time a given request takes to be processed. Client requests should be processed within the assigned latency limits of clients 105 to avoid the case in which a request surpasses a client latency limit, thereby preventing a client 105 from completing a process.

Client's requests may be ordered into levels of priority, based on the importance of processing one request over another. For example, a graphics display request may be processed over a general video display request or an audio read/write request. Client requests may be given dynamic priority levels, allowing the priority level associated with a client to be changed as needed. An identifier within the request, such as the setting of a specific bit, could determine which priority to use. An internal timer could also be used to apply varying levels of priority to a specific request at varying times. Alternatively, intra-client arbiter 145 may alternate among requests from clients of a certain type. Choosing requests by simply alternating is referred to as round robin arbitration. It will be appreciated that other types of arbitration may be performed in place of or in addition to the types discussed herein.

After the requests among like clients are selected and ordered by intra-client arbiter 145, the client requests are delivered to inter-client arbiter 147. Inter-client arbiter 147 chooses among different clients to determine which of the client requests should be processed first. Inter-client arbiter 147 can assign priority to different clients, dependent on the type of client they originate from or the size of the data requests made by the client. For example, inter-arbiter 147 may process requests made by first MPEG decoder 110 before processing requests made by first audio decoder 115. Alternatively, inter-client arbiter 147 may use round robin arbitration, or some other suitable arbitration scheme, to choose among client requests.

The ordered requests from memory controllers 140 and 150 are delivered to respective memory devices, DRAM 160 or DDRDRAM 170. State machine 149 can be used to set the addresses to access in the memory devices. In one embodiment of the present invention, the commands from clients 105 have been ordered by intra-client arbiter 145 and inter-client arbiter 147 to meet the bandwidth and latency requirements of clients 105. For example, in one embodiment, memory resets are given the highest priority, followed by first graphics display 112. The priority list could also include motion compensation related memory requests, for first MPEG decoder 110, leaving all other client requests as having the lowest priority, using round robin arbitration to choose among them.

In one embodiment of the present invention, the multiple memory controllers, such as memory controllers 140 and 150, are operated in tandem, acting like a single memory channel with a proportionally higher available memory bandwidth then each of individual memory controllers 140 and 150. All requests are routed to intra-client type arbiter 145 and inter-client type arbiter 147 of only one memory controller. The state machines 149, used for addressing DRAM 160 and DDRDRAM 170, from their respective memory controllers, memory controllers 140 and 150, are operated in a synchronous manner. An advantage of this configuration is that the memory bandwidth that can be delivered to a single client is the sum of all memory controllers. This configuration may be useful in applications where fewer, high-bandwidth clients are needed. The configuration can also be used to allow slower, less-expensive memories to achieve a higher memory bandwidth. The memory and controllers used are scalable to the types of clients and the processing requirements, and the size of memory used can be changed. Each of clients 105 may have different requirements of memory size. For example, first MPEG decoder 110 may need to write and read from much larger blocks of data to handle video processing than first audio decoder 115. To accommodate this efficiently, multiple memory devices can be used, and the sizes of the device can be changed. For example, a larger memory device can be associated with one memory controller to allow first MPEG decoder 110 to exclusively use the memory device with the larger size.

The speed of the memory device and the bus width is also scalable. Using a memory device with a wider bus, such as a 64-bit bus compared to a 32-bit bus width, can be used to allow devices with larger memory requests to communicate with larger blocks of data at one time. The speed of the memory device can also be changed by using a different memory device. For example, DDRDRAM 170 uses internal phase-locked loops (PLLs) to double the clock speed and process data at twice the speed of a single data rate memory device, such as DRAM 160. Memory controller 140 and 150 can be designed to meet the requirements of clients 105 and the types of memory used and are scalable to efficiently interface with the type of memory device used. It should be appreciated that different types of memory can be used, such as static RAM (SRAM) and static dynamic RAM (SDRAM), without departing from the scope of the present invention.

Figure 2:
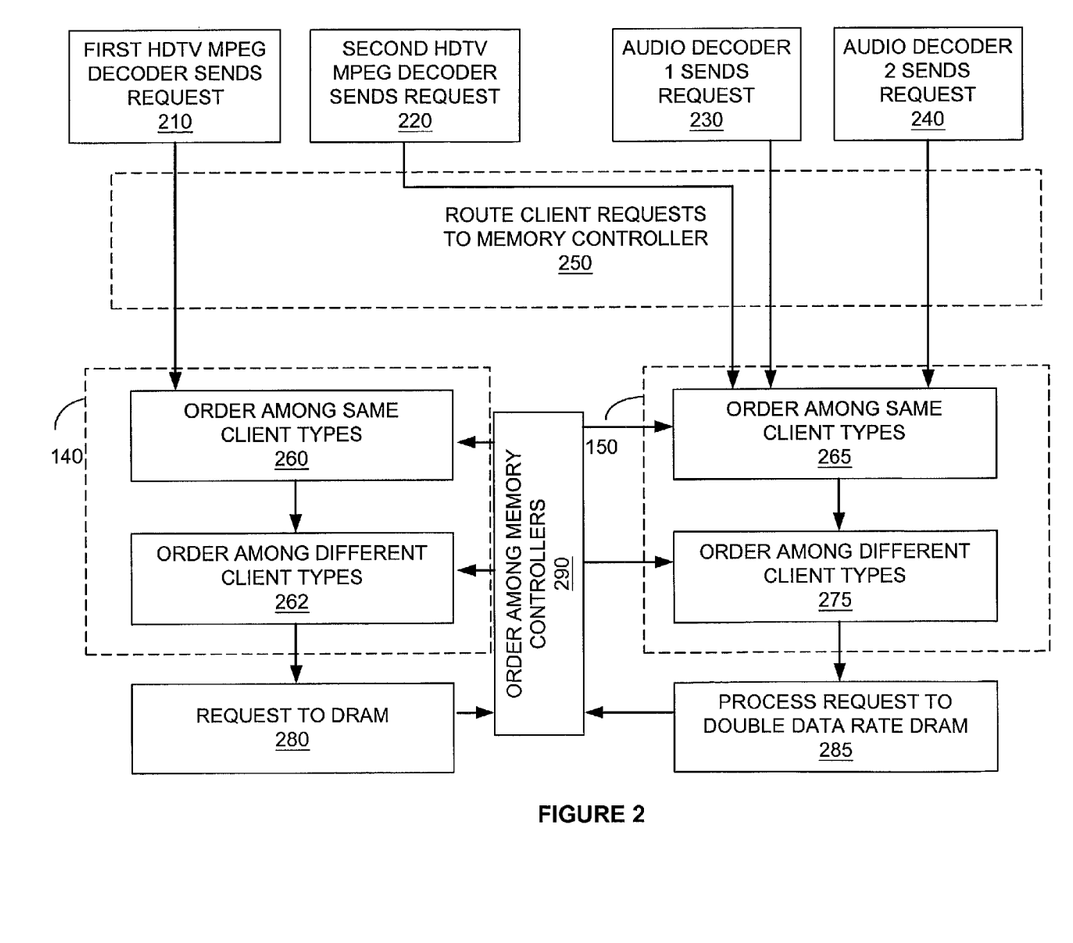
FIG. 2 is a flow chart illustrating how multiple client requests can be distributed among multiple memory devices, according to a specific embodiment of the present invention.

Referring now to FIG. 2, a method of routing multiple motion pictures experts group (MPEG) decoders and multiple audio decoders to two separate memory devices is shown, according to one embodiment of the present invention. Memory requests are sent by multiple clients and routed to two different memory devices. The requests are ordered by differences among clients of similar types and by different client types before being sent to the memory device.

In step 210, a first MPEG decoder sends a request for memory access. In one embodiment, the MPEG data request is related to a high definition television (HDTV) video stream. In step 220, a second MPEG decoder also sends a request related to another HDTV video stream. In step 230, a first audio decoder sends a request to access memory. In step 240, a second audio decoder sends another request for memory access. All the client requests sent in steps 210-240 are intercepted by a router.

In step 250, a router receives and directs the client requests to different memory controllers, such as memory controller 140 and memory controller 150 (FIG. 1), associated with two different memory devices. In one embodiment, the two memory devices are a DRAM and a double data rate DRAM (DDRDRAM). The DDRDRAM can process requests at twice the speed of the DRAM. Furthermore, in the discussed embodiment, the memory controller associated with the DDRDRAM will have twice the available bus width, to process larger amounts of data at a time than the DRAM. In a specific embodiment, the memory controllers are associated with memory devices of a similar type.

At step 250, router identifies the client that initiated the request and the memory address the client requests, to determine which memory controller to route the request to. The requests from the MPEG decoders are both high bandwidth HDTV requests that are separated and sent to different memory devices. Dividing the requests from the MPEG decoders is done to keep the requests from over-taxing a single memory device, allowing them to be processed more quickly. Each request is given individual treatment from a different memory device, allowing them to be processed simultaneously. The memory request from the first MPEG decoder is routed to the DRAM and the request from the second MPEG decoder is routed to the DDRDRAM.

The requests from steps 230 and 240 are also routed. In one embodiment, the requests from the audio decoders are both routed to the memory controller associated with the DDRDRAM. Since the DDRDRAM can operate at twice the rate of the DRAM and is associated with the wider bus, the memory can process more requests than the DRAM, in the same amount of time. Sending the requests from both audio decoders to the DDRDRAM allows the DRAM to be used exclusively for processing the requests from the first MPEG decoder, sent in step 210.

Requests from the same client can also be routed to different memory controllers, allowing the client to access memory address blocks spanning multiple memory modules. For some clients, it is important that read data be returned in the same order that it was requested. In one embodiment, an interlocking method is used to preserve the order that requests originating from the same client are serviced by the two memory controllers. In step 290, an interlock monitors the activity of each client. When a request arrives and is routed to one memory controller, the second memory controller is prohibited from accepting subsequent requests until the first memory controller has finished. Note that each memory controller represents a pipeline that may contain several requests in various stages of completion.

In the specific example the arbitration performed by steps 260 and 262 is trivial because only a single client is being serviced. However, in one embodiment, the operation of the steps 260 and 262 can be the same as steps 265 and 275, which are described in greater detail below. Any requests received from the MPEG decoder 210 are provided to the step 280.

In step 280, the ordered requests from the first MPEG decoder are processed by the single data rate memory device or other memory device. If the requests were associated with a read request, the returned data is sent back to the MPEG decoder, through the memory controller and the router. Note, in other embodiments, the read and write data can be provided directly to the router from the memory devices.

In step 265, arbitration between requests from clients of the same type occurs. For example, if two audio decoder clients have pending requests, the step 265 will provide only one of the requests to the next step. In the specific example, if the request from the second MPEG decoder and the two audio decoders are received as active requests at the step 265. The MPEG decoder request will be provided to the step 275 for further arbitration since it is the only MPEG decoder request. However, step 275 will provide only one of the two active audio decoder client request to the step 275. The audio decoder requests can be compared at step 265 for priority. In one embodiment, the audio decoder requests can be prioritized based upon a round robin technique.

In step 275, the requests having different types are serviced according to specific criteria. In one embodiment, the ordering of service can be dependent upon the specific client requesting the data. For example, the second MPEG decoder request can be given a higher priority than a request generated by either of the audio decoders. Alternatively, the requests from the clients can be processed sequentially based upon a round-robin arbitration scheme. A priority based arbitration scheme can prioritize service to requests that are more critical to operation of a system, that require more memory, that have a greater or lesser associated latency, or any other suitable factor. In one embodiment, the types of requests provided by a single MPEG decoder include motion compensation read and write requests and HDTV video stream data read and write requests. The priority based ordering can place the order of requests as: HDTV stream data write; HDTV stream data read; motion compensation read; and motion compensation write. Alternatively, the requests can be ordered by simply alternating among the type of request being processed, as in round robin arbitration.

In step 285, the requests are sent to the DDRDRAM memory device to be processed. As previously discussed, if the request is associated with a read, the read data is returned to the client, through the associated memory controller and the router.

Figure 3:
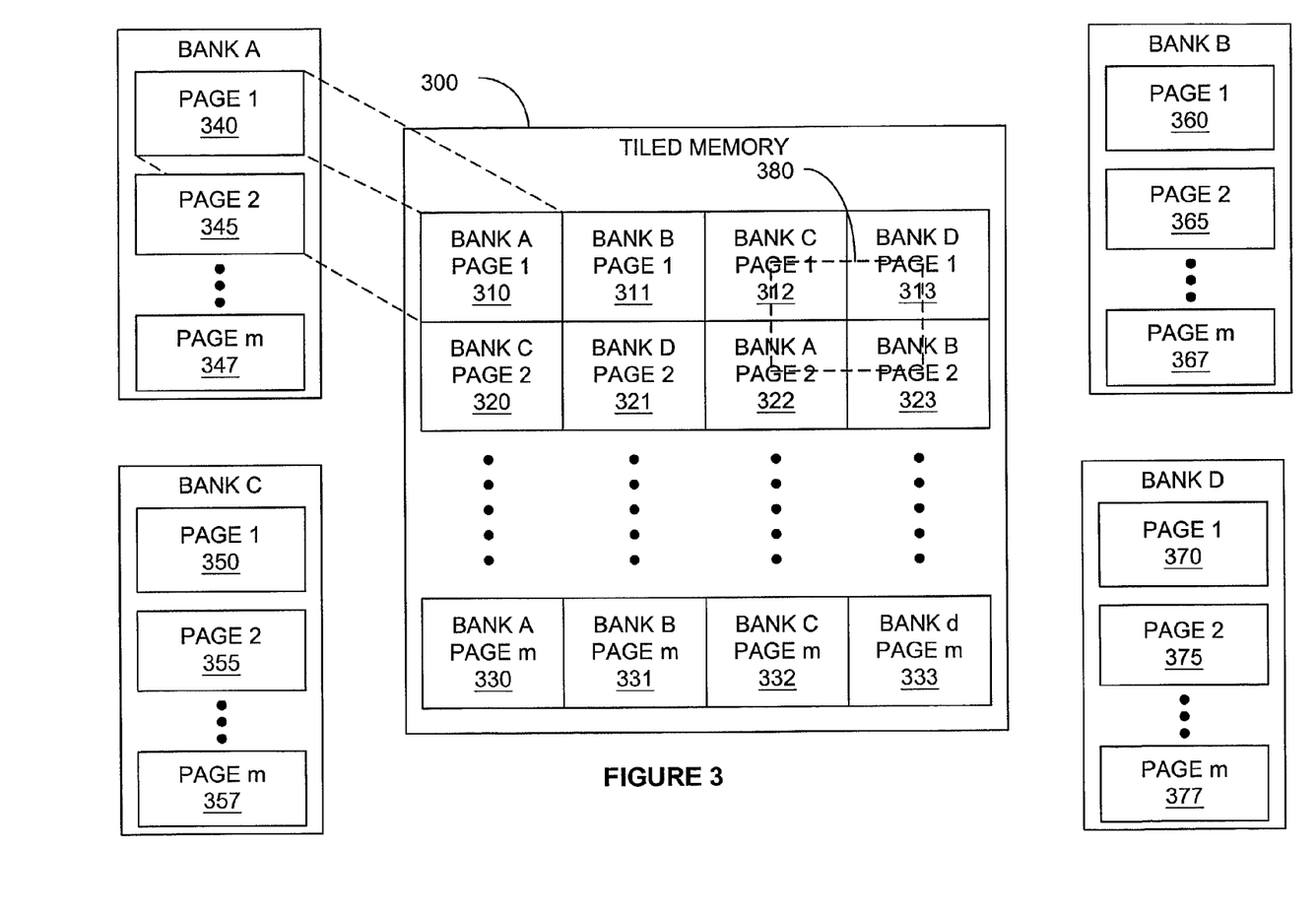
FIG. 3 is a diagram illustrating a method of tiling memory, according to one embodiment of the present invention.

Referring now to FIG. 3, a method of representing MPEG data in memory into a tiled memory structure, by the client, is shown, according to one embodiment of the present invention and is generally referred to as tiled memory 300. MPEG data stored by MPEG video decoders is arranged to allow blocks of data to be accessed without switching pages within a bank. If switching pages within a bank of memory is avoided, latency problems due to the page switch can be avoided.

MPEG decoders store image, or frame, information in groups of stored data referred to as "blocks". A block 380 of data can be used to represent a rectangular portion of a video image or frame. Block 380 can include information related to a set of picture elements (PEL) of a video frame. In one embodiment, block 380 represents 16×16 PELs in a video frame. To reduce the amount of data needed for representing the PELs, a transformation can be performed on the data gathered from the PELs. Accordingly, a transformation can be used on block 380 to recreate the image, such as through a discrete cosine transform (DCT) of the data in block 380. Sets of blocks may be used to represent a single frame of video data. Subsequent frames can be pieced together to generate video, such as is done with MPEG decoding. Storing frame information in memory, a block 380 of image data may span several areas of memory.

Multiple memory components can be assigned as memory banks. The banks are assigned logical values in the form of logical addresses to represent the portions of the memory. Each bank can in turn be logically divided into different pages. Pages within a memory bank can represent different sets of memory addresses associated with a row of memory addresses. Page mode dynamic random access memory is a technique used to support faster data accessing, wherein a whole page within a bank is accessed at one time. When accessing an address in memory, all the data in the page of memory, in which the address lies, is accessed. The accessed page can be stored, such as in a cache, for faster processing. Page mode dynamic random access memory allows memory access within a bank page to be performed quickly; however, when an address outside of the page is requested, the new page, associated with the new address, must be scanned to switch pages within the bank. Switching pages results in an undesired latency when processing data associated with MPEG decoders.

MPEG decoding clients can store/retrieve data to/from memory by tiling different pages from different banks in a configuration such as tiled memory configuration 300. Different pages from a first bank can be used as "tiles" in tiled memory 300. For example, page 340 (page 1 of bank A) is mapped to tile 310 in tiled memory 300. Similarly, page 360 (page 1 of bank B) is mapped to tile 311. Pages 350 and 370 are mapped to tiles 312 and 313, respectively. In one embodiment, a single tile is used to represent a single page. It should be noted that $2^n$ tiles may be used to represent a page. For example, with n equal to 1, two tiles would represent a page and a single tile would represent half a page. It should also be appreciated that a tile can be represented by a plurality of pages. For example, a single tile may represent two pages.

In a specific application, each tile will store data associated with a block of pixels that are displayed consecutively adjacent. In addition, a lower right pixel, represented in one tile, for example tile 312, is displayed immediately adjacent to the lower left pixel represent in tile 313. Therefore, the tiled data is logically accessed using an X-Y coordinate system that is analogous to how pixels are used to represent images.

When mapping adjacent tiles on tiled memory 300, the clients can avoid placing tiles associated with different pages within the same bank of memory beside each other. This avoids additional latency time associated with accessing data from a different page of the same memory bank. When a client is storing or retrieving a block of data, such as block 380, the client can give the upper left address and the lower right address to indicate the block of memory associated with block 380. Note that block 380 can span multiple tiles in tiled memory 300. While scanning the multiple tiles within block 380, the memory can be forced to alternate access between different banks and pages. If any change in a page is forced within the same bank, latency will have to be incurred to access the new page. To avoid this, the tiles are arranged in tiled memory 300 so that no adjacent tiles will include the same bank of memory.

If pages 345 and 365 are mapped to tiles 322 and 323, all of block 380 can be accessed without forcing a change in the page of a bank. While banks A–D and pages 1 and 2 are being accessed, the page within a bank is not switched over block 380. Pages 355 and 375 are mapped to tiles 320 and 321, respectively, to avoid page switching when accessing blocks over that portion of tiled memory 300. Similarly, the tiles of tiled memory 300 are all arranged so that at any given vertex, where four tiles meet, all adjacent tiles indicate different banks of memory. Rows are completed to form the rest of tiled memory 300 in the same fashion. In one embodiment, where there are m pages in banks A–D, pages 347, 367, 357 and 377 are mapped to tiles 330, 331, 332 and 333, respectively. It should be noted that additional tiles may be placed across the rows of tiled memory 300, as necessary. Furthermore, more than four banks can be used to implement a configuration similar to tiled memory 300. The size of the block being accessed, such as block 380, can also be varied so long as it does not force a change in page within similar banks in tiled memory 300. For example, a block having an X or Y dimension greater than the X or Y dimension of a tile would generally cause a page change within a bank.

In implementing a tiled memory configuration, such as tiled memory 300, an equation can be used to calculate the tiled surface address, when given an (x,y) coordinate. Using given "x" and "y" coordinates in bytes, along with information about the values of "offset" and "PITCH", an intermediate tiled address, "AITILE", can be calculated. "Offset" refers to the starting byte offset to the base address of the tiled surface. "PITCH" refers to the pitch, or width of the tiled memory surface. "Tile_height" refers to the height of a tile in bytes; while "tile_width" refers to the width of the tile, in bytes. "AITILE" can be calculated using the following equation:

$$AITILE = Offset + \{(y \ div \ tile\_height) * tile\_height * PITCH\} + \{(x \ div \ tile\_width) * tile\_width * tile\_height\} + \{(y \ mod \ tile\_height) * tile\_width\} + (x \ mod \ tile\_{width}).$$

The tiled surface address can be taken from "AITILE". "AITILE" provides an intermediate address for determining the absolute address, referred to as "ATILE", of a tile. The memory spanned by a tile, using a configuration such as tiled memory configuration 300, includes different memory banks. To determine "ATILE", a bank bit may need to be switched in value in its location in "AITILE". Using the size of the tile as "tile_size", the location of the bank bit, "bank_bit", is determined according to the following equation:

$$Bank\_bit = \log_2 tile\_size.$$

In at least one embodiment, "ATILE" is determined by altering the value of the bit determined by "bank_bit" according to the following equations:

$$ATILE = AITILE;$$

$$ATILE(bank\_bit) = ATILE(bank\_bit) \times OR[(y(\log 2 (tile\_height)) \ and \ not \ pitch \ (\log 2(tile\_width) + 1)].$$

The clients requesting the data can map memory into a tiled configuration, such as tiled memory 300. When the client attempts to communicate with memory, a memory controller, such as memory controller 140 (FIG. 1), can intercept the memory request and convert it to a linear format for processing. Alternatively, a memory controller can be used to format linear memory operations into a tiled memory configuration. The use of tiled memory 300 can allow improved memory accessing and processing times over linear memory configurations. Such an improvement can be used to allow for the use of multiple MPEG decoders to access memory in a timely fashion.

Figure 4:
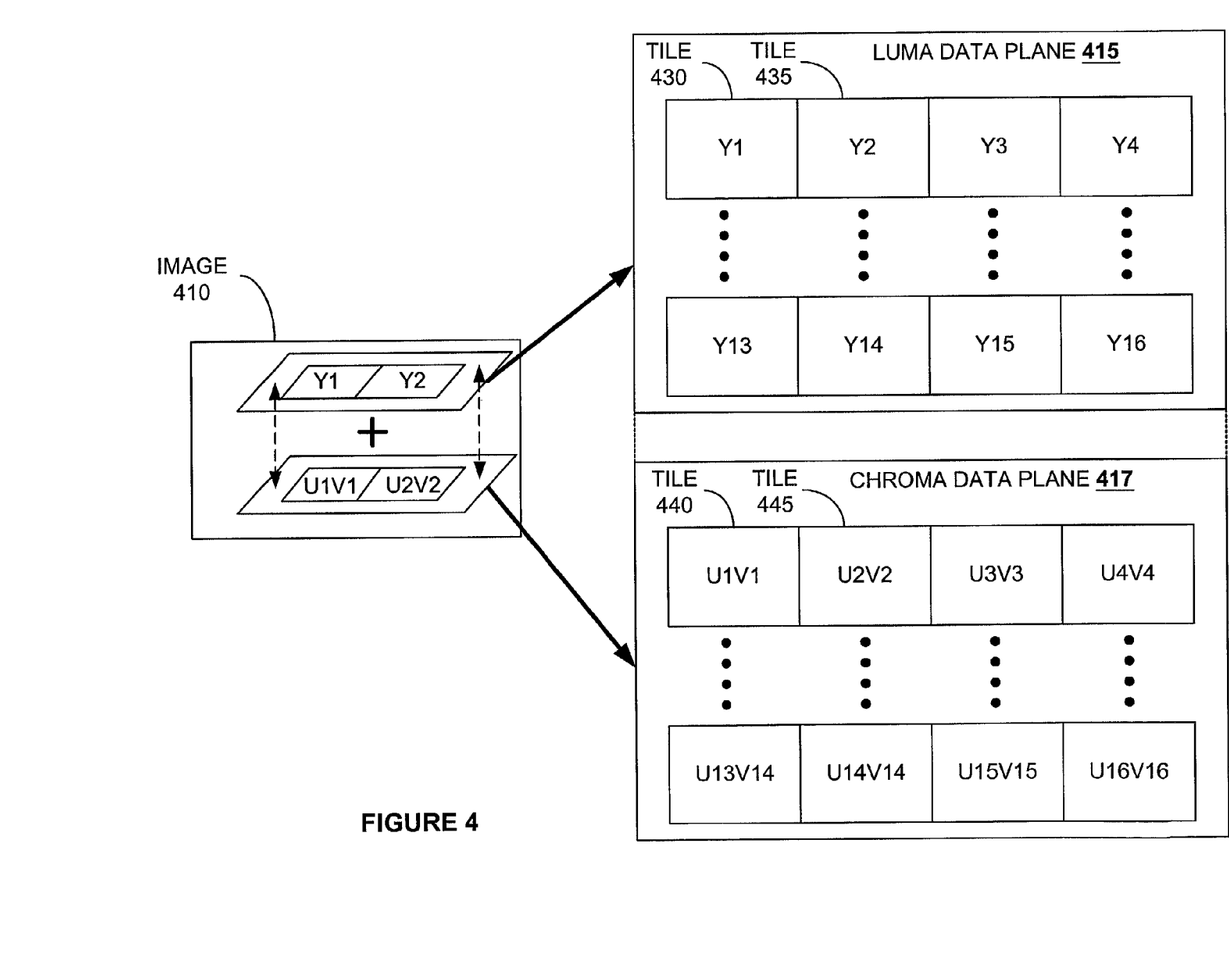
FIG. 4 is a diagram illustrating how Luma (Y) image data and Chroma (UV) image data, pertaining to a single portion of an image, are stored in subsequent tiles of memory, according to another embodiment of the present invention.

Referring now to FIG. 4, a method of storing different types of image data in different memory tiles is shown. A single video image, such as image 410, is composed of a plurality of PELs. The PELs may contain data associated with different color components. In one embodiment, the PELs include Luma (Y) data 415, associated with the image intensity, and Chroma (UV) data 417, associated with the image color, where UV data 417 can be composed of separate color channels. Note during video encoding, the Y data 415 and the UV data 417 are separated into different data types to store a representation of first image 410. For example, the block labeled Y1 in plane 415 represents the Y component of a first portion of the image 410, while the block labeled Y2 in plane 415 represents the Y component of a second portion of the image 410 that is adjacent to the first portion. The blocks U1V1 and U2V2 represent the UV components of the first and second video blocks.

As previously discussed, a single block of image information represents a set of PELs that form a portion of an image frame. To reduce the amount of data stored for each block, the blocks are sub-sampled. Only the Luma and Chroma data associated with some of the PELs are stored in the block. The human eye has been considered to be more sensitive to changes in luminance image information than to chrominance image information. Accordingly, for image data compression, less Chroma data is collected than Luma data within a block. In one embodiment, a single block represents 16×16 PELs and only includes four Luma data values and two Chroma values.

Blocks of image 410 may be divided into Y data portions and V data portions. The Y data of the image 410 is stored in a first plane, Luma data plane 415, while the UV data is stored in a second plane, Chroma data plane 417. For example, a Y1 portion of image 410 may correspond to the same area of image 410 as an associated U1V1 portion of image 410. An offset of image 410 associated with the Y1 portion may correspond to an offset of image 410 associated with the U1V1 portion. It should be noted that the offsets may be approximately the same, as the Y1 portion and the U1V1 portion indicate the same block of image 410; however, as Y and UV data vectors are slightly different, the offsets may also be slightly different. Note the UV data, as shown in FIG. 4, has been compressed, or sub-sampled, so that both the U component and the V component corresponding to a tile location can be stored together in one tile, or part of one tile. In other embodiments, the UV data would not be compressed and each component would be stored in its own plane. In another embodiment, where the UV data is compressed by at least four times, the UV data of images associated with two tiles can be saved in a single tile. For example, referring to FIG. 5, compressed UV data can be stored in tile C5 of plane 417 that corresponds to the Y data stored in tiles A1 and A3 of plane 415. Note if tile C5 of plane 417 stored data corresponding to tiles A1 and C2, a latency conflict would occur when both C5 and C2 are being accessed.

Figure 6:
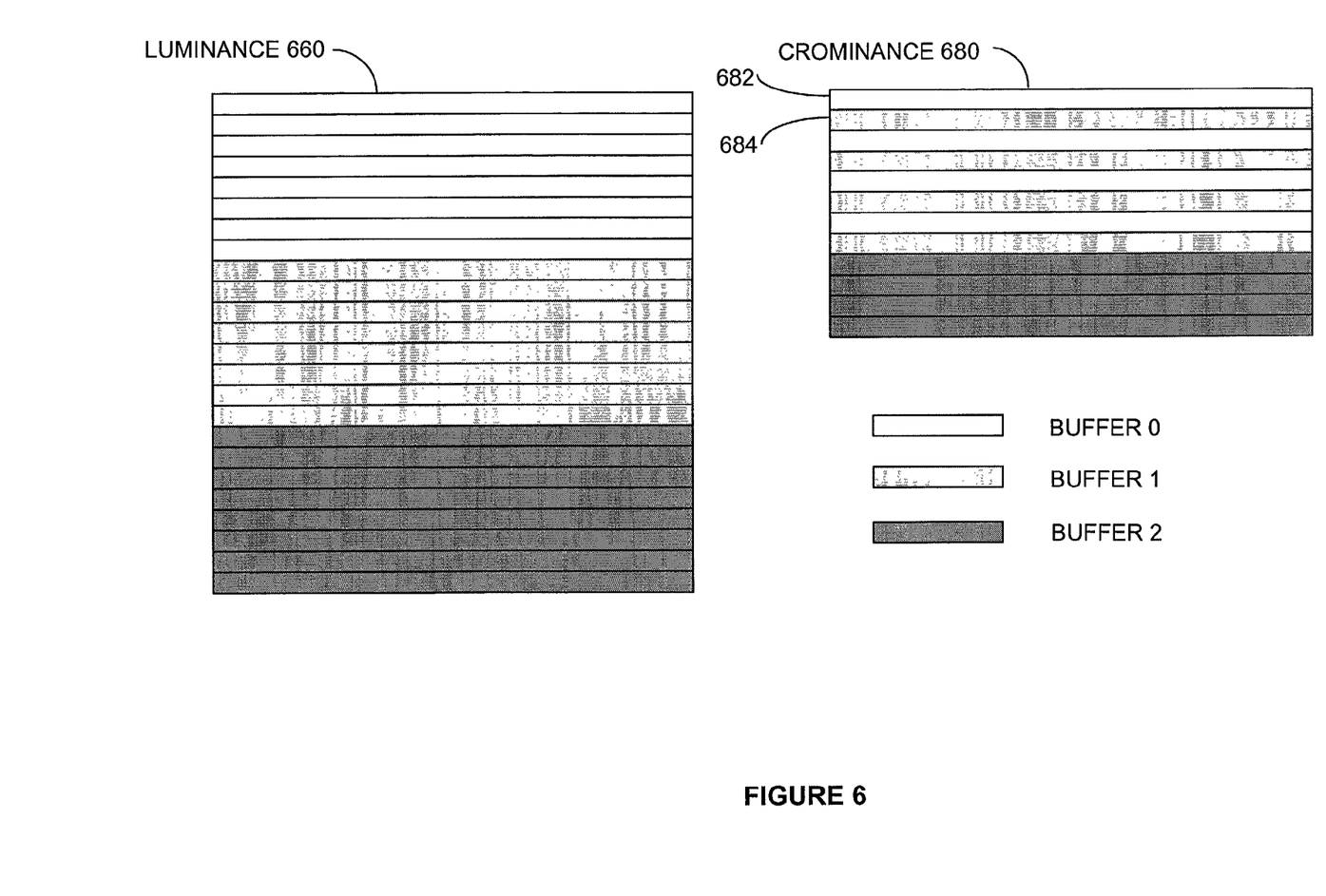
FIG. 6 is a block diagram illustrating how Luma (Y) image data and Chroma (UV) image data from separate image frames are collected and stored.

To decode the image associated with portion Y1 of image 410, the Y data of tile Y1 430 is combined by overlaying the Y data with the UV data of tile U1V1 440, by a decoder, to render an output image, as discussed further in FIG. 6. In one embodiment, when the image portion being represented by tiles Y1 430 and U1V1 440 is being rendered, the entire image portion stored in Luma data plane 415 is read before reading the image portion in Chroma plane 417. Once all the data related to the image portion is read, the image portion is rendered. In another embodiment, the image data is accessed on a word-by-word basis alternating between the Luma data plane 415 and the Chroma data plane 417. For example, for each word accessed from tile Y1 430 a corresponding word from tile U1V1 440 is accessed. In this manner, the data from tiles Y1 430 and U1V1 440 can be provided to a decoder for generation of the final image. Similarly, data from tile Y2 435 and tile U2V2 445 is provided to the decoder to render another portion of image 410.

Figure 5:
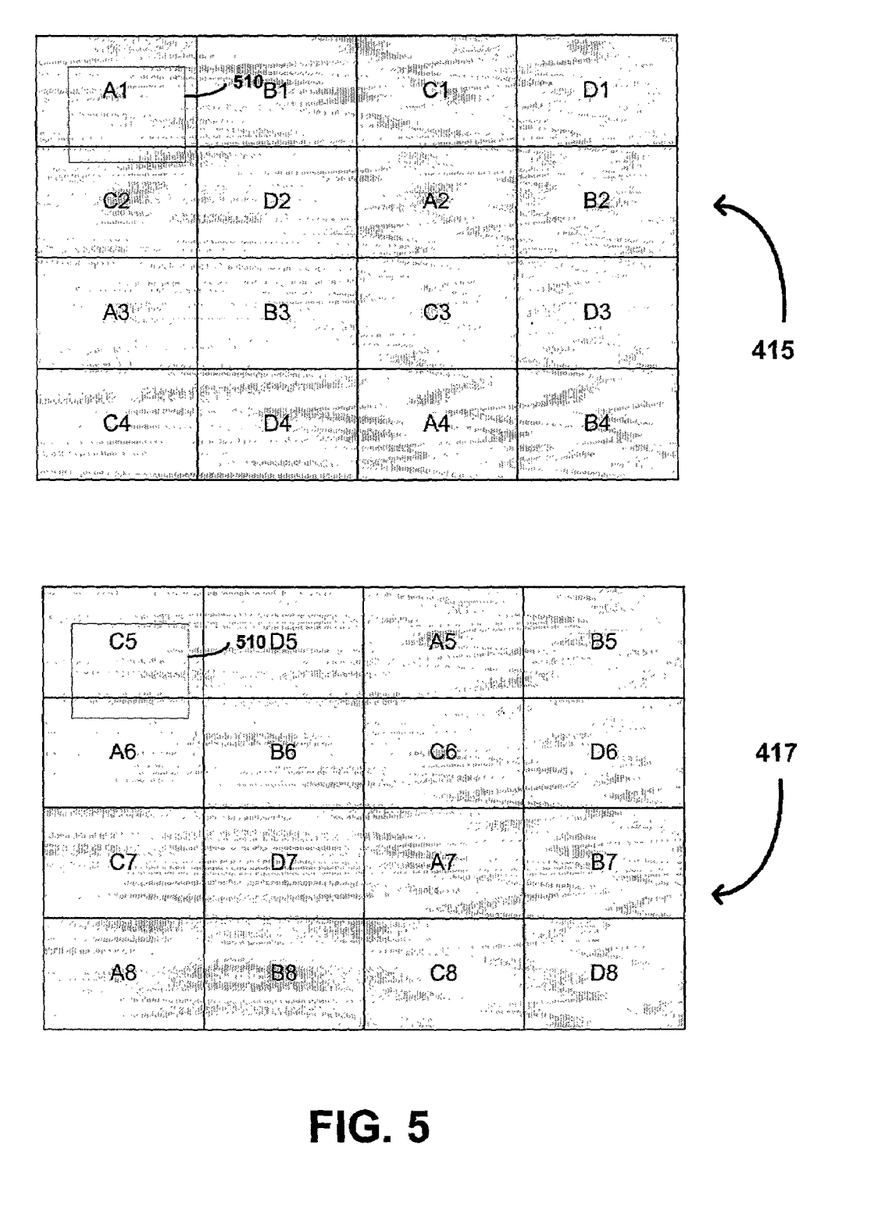
FIG. 5 is a block diagram illustrating how Luma (Y) image data and Chroma (UV) image data is collected in separate memory planes.

To avoid additional latency due to page faults when accessing multiple planes of data, corresponding tile locations between planes need to be in different banks. FIG. 5 illustrates non-overlapping planar memory partitions. Specifically, if block 510 represents an image block being accessed, the tiles in planes 415 and 417 are partitioned among the memory banks to avoid additional latency.

For example, when a top left most pixel of block 510 is being accessed, banks A1 and C5 will be accessed. In one embodiment, the Luma data for block 510 is accessed from Luma plane 415, followed by the Chroma data being accessed from Chroma plane 417. Specific methods may be employed for improving memory access efficiency when reading image data from memory. For example, if the pixels are read by rows from left to right across block 510, no page conflicts occur. Likewise, as rows of pixels are read from top to bottom, in Luma plane 415, page conflicts are reduced due to the non-overlapping bank structure indicated. However, if the Chroma data of block 510 is read from top to bottom, in Chroma plane 417, after the Luma data in A1 and C2 is read from Luma plane 415, page conflicts will occur as A1 and C2 in Luma plane 415, share banks with C5 and A6, respectively, in Chroma plane 417. In one embodiment, to avoid page conflicts when reading image data, blocks read in Chroma plane 417 are read in the opposite direction as blocks read in the Luma plane 415. For example, if block 510 is read from top to bottom in Luma plane 415, from tile A1 to tile C2, block 510 is read from bottom to top in Chroma plane 517, from tile A6 to tile C5.

It should be noted that a block stored in planes 415 and 417, such as block 510, may be mostly contained in a single tile. For example, in Luma plane 415, block 510 may be contained mostly in tile A1, with a minimal portion of block 510 overlapping into tile C2. Depending on the amount of block 510 stored in tile C2 of Luma plane 415, all of block 510 may be contained in tile C5, in Chroma plane 417, with none of block 510 stored in tile A6. If the Luma data read from tile A1 to C2 in Luma plane 415 is followed by reading tile C5 of Chroma plane 417, a page conflict will occur. Therefore, whenever a minimal portion of a block has been stored in a tile row in Luma plane 415, below a set threshold, the block is read in the direction from the row with the minimal portion of the block to the row with the larger portion stored. Accordingly, reading data in Chroma plane 417 is performed in the opposite direction. For example, if most of block 510 has been stored in tile A1 in Luma plane 415, block 510 is read in Luma plane 415 from bottom to top, from tile C2 to tile A1. Corresponding Chroma data stored in Chroma plane 417 is read from top to bottom. It will be appreciated that other methods may be employed for improving memory access efficiency and the selection of one specific method over the other can be made without departing from the scope of the present invention. In one embodiment, an offset used in storing block 510 in Luma plane 415 may correspond to and be approximately the same as an offset used in storing block 510 in Chroma plane 417.

In another embodiment of this invention, the page conflict between consecutive block accesses is also eliminated. If, for example, two identical blocks 510 of FIG. 5 are being requested in series, and the access order was C2 to A1 on Luma plane 415 followed by C5 on Chroma plane 417 as described above, then the resulting access pattern is C2, A1, C5. If a second identical block is accessed, a page conflict will occur in going from C5 for the Chroma access of the first block to C2 for the Luma access of the second block. If the portion of the block 510 in Chroma plane 417 is wholly contained in page C5, then the portion of the block 510 in Luma plane 415 that lies in page C2 will be minimal. The block 510 in the Luma plane 415 can be fetched by accessing a few rows from A1, followed by the minimal portion from C2, followed by the remaining portion of Luma block 510 from A1. Then the Chroma block 510 is fetched from C5. The resulting access pattern is A1, C2, A1, C5, and has no internal page faults, and may be followed by an identical block 510 access without encountering a page fault between C5 of the first block and A1 of the second block.

In another embodiment, the page conflict between consecutive block accesses is further eliminated by considering the departure bank of the preceding memory access. In the previous example, the A1, C2, A1, C5 access pattern was used to hide the single row access to C2 and at the same time, allow the entry and departure banks to be different. It should be appreciated that the same block 510 could also be fetched without page conflicts by reversing the access pattern by fetching the block 510 in Chroma plane 417 before the block 510 in Luma plane 417 with the access pattern of C5, A1, C2, A1. This symmetry can be used to advantage if the previous memory access happened to depart from Bank A instead of Bank B, C, or D.

Referring now to FIG. 6, Luma and Chroma data associated with different video frames are collected among three frame buffers, according to at least one embodiment of the present invention. Luma data, received through frame buffers 0–2, is stored in a collection of Luma planes 660 while Chroma data, received through frame buffers 0–2, is stored in a collection of Chroma planes 680.

Portions of a single image frame may be stored as separate blocks of data, wherein the data includes Luma (Y) data and Chroma (UV) data. As previously discussed, compression of the data within a single block may be performed using data transformation, such as through the discrete cosine transform (DCT), or by sub-sampling the Y and UV data. Accordingly, further compression may be performed among sets of consecutive frames, or video. A single frame may be compressed through intra-frame coding, according to differences among blocks of picture elements (PEL) within a single frame.

Since corresponding blocks in subsequent frames may not change, inter-frame coding may also be performed, wherein differences among blocks of sequential frames are used in data compression. A method of temporal prediction may be used for inter-frame coding of MPEG video data. Initially, a set of blocks corresponding to a first frame of data is transmitted. The data may include intra-frame coding among the blocks and the frame is generally referred to as an I-frame. Once the I-frame information has been sent, a frame with prediction data, referred to as a P-frame, may be transmitted. The P-frame data includes prediction vectors for the blocks in the preceding frame, such as motion vectors relating to blocks within a previously sent I-frame.

In order to allow a decoder to appropriately decode a video from nearly any point in the video transmission, multiple I-frames must be given to provide a reference. Additionally, bi-directional, or B-frames, may be transmitted to provide prediction information for previous and upcoming frames, allowing prediction information to be gathered when playing stored video data in reverse. B-frames may also be sent intra-coded, without any prediction information. It should be noted that B-frames are never used as references for other frames using temporal prediction.

Compressed video information is inherently variable in nature. This is caused by the variable content of successive video frames. To store video at a constant bit rate it is therefore necessary to buffer the variable bitstream generated in the encoder in frame buffers. Incoming video data can be stored in frame buffers 0–2 and stored in memory, Y planes 660 and UV planes 680, at a constant rate. Each buffer 0–2 can be used to represent a sequential frame of video data.

In one embodiment, while Y data is stored in Y plane 660 in blocks of tiles representing different buffers, the UV data from buffers 0 and 1 is interweaved. The UV data is stored in alternating locations within tiles. In UV planes 680, UV data associated with buffers 0 and 1 are stored in alternating locations within tiles. The interweaving of UV data may allow simplified access among frames of prediction data by allowing an offset within a Y block to be used. For example, in one embodiment, buffer 0 relates to I-frame data, buffer 1 relates to P-frame data, and buffer 2 relates to B-frame data. When inter-coded prediction data is being decoded, information in a P-frame must be referenced to a corresponding I-frame to properly decode the frame associated with the P-frame. Accordingly, the interweaved structure of UV planes 680 allows the I-frame data in plane 682 to be easily referenced when decoding the P-frame data in plane 684 by using approximately the same offset value.

B-frame UV data, associated with buffer 2, is not used for reference by I- or P-frames. Therefore, it is not necessarily advantageous to interweave the B-frame data with the I- or P-frame data. Accordingly the data from buffer 2 is simply stored in sequential planes. In addition, the Y data from buffers 0–2 is also simply stored in blocks of planes associated with the different buffers. In one embodiment, the Y data associated with a single frame is twice as large as the UV data and interweaving the Y data offers little to no advantage.

It will be appreciated that other frame types may also be sent. For example, in one embodiment, frame data is encoded into D-frames, or display frames, which are stored in a separate frame buffer. Accordingly, it should also be appreciated that additional frame buffers may be used. In on embodiment, four frame buffers are used and a fourth buffer, buffer 3 (not shown) is introduced. The UV data associated with buffers 2 and 3 are interweaved in the manner illustrated for buffers 0 and 1.

The various components present in the present application may be implemented using an information handling machine such as a data processor, or a plurality of processing devices. Such a data processors may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed above.

When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry comprising of a state machine and/or logic circuitry, or it may be unnecessary because the function is performed using combinational logic.

Such an information handling machine may be a system, or part of a system, such as a computer, a personal digital assistant (PDA), a hand held computing device, a cable set-top box, an Internet capable device, such as a cellular phone, and the like.

It will be appreciated that in other embodiments, the memory controllers can intercept memory requests along a peripheral component interconnect (PCI) bus. The memory used to implement the invention may be altered from the types discussed, static RAM (SRAM), single data rate RAM, and other forms of memory may be used. Furthermore, other types of client requests and other types of clients can be incorporated, without departing from the scope of the present invention. The memory controllers can be used to perform the method of tiling memory described herein. Furthermore, the method of tiling memory may be performed by a software driver, such as an application peripheral interface (API). It should now be appreciated by those skilled in the art that the present invention has the advantage that requests from multiple motion pictures experts group (MPEG) video decoders can be handled and ordered for improved efficiency in communicating with memory.

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
storing image data in a multi-plane tiled-surface format, wherein the image data is stored in a first plane and a second plane, the first plane represented by a first set of tiles and the second plane represented by a second set of tiles, wherein a first portion of image data stored in the first plane has a first image data type, and a second portion of image data stored in the second plane has a second image data type, each plane of the multi-plane tiled-surface format being a logical arrangement of tiles representing a plurality of memory pages within memory banks, the tiles arranged such that memory pages of data for sequential retrieval are implemented in different memory banks; and
accessing the data in the first plane from top to bottom and the data in the second plane from bottom to top.

2. The method as in claim 1, wherein:
storing image data includes storing, for each image location in the first plane, a corresponding image location in the second plane.

3. The method as in claim 2, wherein an x-y offset of each image location is approximately the same in the first plane as in the second plane.

4. The method as in claim 1, wherein:
the image data is MPEG image data;
the first image data type is Y data; and
the second image data type is UV image data.

5. A method comprising:
storing at least a first color component of an image in a first plane of tiled memory;
storing at least a second color component of the image in a second plane of tiled memory;
reading a first block of data in a first direction, wherein the first block of data represents a portion of the image stored in the first plane of memory; and
reading a second block of data in a second direction, wherein the second block of data represents the portion of the image stored in the second plane of memory and the second direction is opposite the first direction.

6. The method of claim 5, wherein:
storing the at least a first color component includes the at least a first color component being luma data; and
storing the at least a second color component includes the at least a second color component being chroma data.

7. The method of claim 6, wherein the amount of chroma data stored is less than the amount of luma data stored.

8. The method of claim 6, wherein the amount of luma data stored is at least twice the amount of chroma data.

9. The method of claim 5, wherein an offset to the first block of data within the first plane is approximately the same as an offset tote second block of data within the second plane.

10. A system comprising:
a plurality of memory banks;
an information handling machine to:
store at least a first color component of an image in the plurality of memory banks as a first plane of tiled memory;
store at least a second color component of the image in the plurality of memory banks as a second plane of tiled memory;
read a first block of data in a first direction, wherein the first block of data represents a portion of the image stored in the first plane of tiled memory; and
read a second block of data in a second direction, wherein the second block of data represents the portion of the image stored in the second plane of tiled memory and the second direction is opposite the first direction.

11. The system of claim 10, wherein:
the at least a first color component is luma data; and
the at least a second color component is chroma data.

12. The system of claim 11, wherein the amount of chroma data stored is less than the amount of luma data stored.

13. The system of claim 11, wherein the amount of luma data stored is at least twice the amount of chroma data.

14. The system of claim 10, wherein an offset to the first block of data within the first plane is approximately the same as an offset to the second block of data within the second plane.

15. A method of accessing a block of data comprising:
storing image data representing an image portion in a multi-plane tiled-surface format, wherein the image data is partially stored in a first plane and partially stored in a second plane, the first plane represented by a first set of tiles and the second plane represented by a second set of tiles, wherein a first portion of image data stored in the first plane has a first image data type, and a second portion of image data stored in the second plane has a second image data type;
accessing a first portion of the image data stored in the first plane, wherein the first portion of data is stored in a first tile of the first set of tiles and the first tile is associated with a first bank of memory;
accessing a second portion of the image data stored in the first plane after accessing the first portion of the image data, wherein the second portion of the image data is stored in a second tile of the first set of tiles, and the second tile is associated with a second bank of memory; and
accessing a third portion of the image data stored in the first plane after accessing the second portion of the image data, wherein the third portion of the image data is stored in the first die of the first set of tiles.

16. The method of claim 15, further comprising:
rendering the image portion based upon the first, second, and third image data.

17. The method of claim 15, further comprising:
accessing the image data stored in the second plane after accessing the third portion of the image data.

18. The method of claim 15, further comprising:
rendering the image portion based upon the first, second, and third image data after accessing the image data stored in the second plane.

* * * * *

UNITED STATES PATENT AND TRADEMARK OFFICE
CERTIFICATE OF CORRECTION

PATENT NO. : 7,016,418 B2 Page 1 of 1
APPLICATION NO. : 09/923520
DATED : March 21, 2006
INVENTOR(S) : Chun Wang et al.

It is certified that error appears in the above-identified patent and that said Letters Patent is hereby corrected as shown below:

In Column 15, Line 66 change "offset tote" to "offset to the"

In Column 16, Line 54 change "first die" to "first tile"

Signed and Sealed this

Eighth Day of August, 2006

JON W. DUDAS
*Director of the United States Patent and Trademark Office*